(12) United States Patent
Stubbers et al.

(10) Patent No.: US 10,366,795 B2
(45) Date of Patent: Jul. 30, 2019

(54) LONG-LIFE HIGH-EFFICIENCY NEUTRON GENERATOR

(71) Applicant: STARFIRE INDUSTRIES LLC, Champaign, IL (US)

(72) Inventors: Robert Andrew Stubbers, Champaign, IL (US); Brian Edward Jurczyk, Champaign, IL (US); Darren Adam Alman, Savoy, IL (US); Matthew David Coventry, Champaign, IL (US); Michael Jerome Schaus, Glen Ellyn, IL (US)

(73) Assignee: Starfire Industries LLC, Champaign, IL (US)

( * ) Notice: Subject to any disclaimer, the term of this patent is extended or adjusted under 35 U.S.C. 154(b) by 106 days.

(21) Appl. No.: 15/469,926

(22) Filed: Mar. 27, 2017

(65) Prior Publication Data

US 2017/0301410 A1    Oct. 19, 2017

Related U.S. Application Data (63) Continuation of application No. 12/919,912, filed as application No. PCT/US2009/035600 on Feb. 27, 2009, now Pat. No. 9,607,720.

(Continued)

(51) Int. Cl.
*G21B 1/19* (2006.01)
*H05H 3/06* (2006.01)
*H05H 6/00* (2006.01)
*G21G 4/02* (2006.01)

(52) U.S. Cl.
CPC .............. *G21B 1/19* (2013.01); *H05H 3/06* (2013.01); *H05H 6/00* (2013.01); *G21G 4/02* (2013.01)

(58) Field of Classification Search
CPC ... G21B 1/00; G21B 1/19; H05H 3/06; G21G 4/02
See application file for complete search history.

(56) References Cited

U.S. PATENT DOCUMENTS 3,571,734 A * 3/1971 Consoli .................... H05H 1/00
 313/161
3,664,960 A * 5/1972 Wood .................... H01J 27/022
 250/423 R (Continued)

OTHER PUBLICATIONS

Intellectual Property India, Indian Office Action in corresponding Indian Application No. 6814/DELNP/2010 dated Apr. 9, 2018 (6 pages).

*Primary Examiner* — Lily C Garner
(74) *Attorney, Agent, or Firm* — Leydig, Voit & Mayer, Ltd.

(57) ABSTRACT

The design of a compact, high-efficiency, high-flux capable compact-accelerator fusion neutron generator (FNG) is discussed. FNG's can be used in a variety of industrial analysis applications to replace the use of radioisotopes which pose higher risks to both the end user and national security. High efficiency, long lifetime, and high power-handling capability are achieved though innovative target materials and ion source technology. The device can be sealed up for neutron radiography applications, or down for borehole analysis or other compact applications. Advanced technologies such as custom neutron output energy spectrum, pulsing, and associated particle imaging can be incorporated.

21 Claims, 7 Drawing Sheets

Related U.S. Application Data

(60) Provisional application No. 61/031,899, filed on Feb. 27, 2008, provisional application No. 61/031,908, filed on Feb. 27, 2008, provisional application No. 61/031,912, filed on Feb. 27, 2008, provisional application No. 61/031,921, filed on Feb. 27, 2008, provisional application No. 61/031,916, filed on Feb. 27, 2008.

(56) References Cited

U.S. PATENT DOCUMENTS

| | | | | |
|---|---|---|---|---|
| 3,779,864 | A | * | 12/1973 | Kaw .................... H05H 1/18 376/132 |
| 3,794,875 | A | * | 2/1974 | Stark .................... H01J 41/20 331/7 |
| 4,309,249 | A | | 1/1982 | Steinberg et al. |
| 4,568,509 | A | * | 2/1986 | Cvijanovich .......... G21B 1/03 376/106 |
| 5,293,410 | A | * | 3/1994 | Chen .................... H05H 3/06 376/108 |
| 7,200,198 | B2 | | 4/2007 | Wieland et al. |
| 9,008,256 | B2 | | 4/2015 | Stubbers et al. |
| 2002/0150193 | A1 | * | 10/2002 | Leung .................... H05H 3/06 376/108 |
| 2003/0006708 | A1 | * | 1/2003 | Leung .................... H01J 27/18 315/111.81 |
| 2007/0237281 | A1 | * | 10/2007 | Yakovlyev ............. H05H 3/06 376/157 |
| 2010/0232559 | A1 | * | 9/2010 | Takeishi ................ H01J 27/18 376/108 |
| 2012/0097532 | A1 | * | 4/2012 | DeLuze ................ G21B 3/006 204/278 |

\* cited by examiner

LONG-LIFE HIGH-EFFICIENCY NEUTRON GENERATOR

CROSS-REFERENCE TO RELATED APPLICATIONS

This patent application is a continuation application of U.S. application Ser. No. 12/919,912, filed Oct. 29, 2010 (to issue as U.S. Pat. No. 9,607,720, which claims priority to PCT International Application No. PCT/US09/35600, filed Feb. 27, 2009, which claims the benefit of U.S. Provisional Patent Application No. 61/031,899, filed Feb. 27, 2008, 61/031,908, filed Feb. 27, 2008, 61/031,912, filed Feb. 27, 2008, 61/031,916 filed Feb. 27, 2008, and 61/031,921, filed Feb. 27, 2008, the contents of which are incorporated herein by reference in their entireties, including any references therein.

BACKGROUND OF THE INVENTION

Radioactive nuclear sources are currently used in industry in a variety of places, including on-line elemental analysis of mining, coal, and cement feedstocks, and sub-surface scanning (e.g. soil composition analysis and landmine detection). The traditional neutron source has been a radioisotope such as $^{252}$Cf or Am—Be. Radioisotopes are always on, require shielding, limit types of analysis (e.g. no pulsing or time-of-flight), and pose a personnel hazard during manufacturing and assembly, as well as a security hazard due to threats of so-called "dirty bombs". Neutrons can also be generated with conventional accelerator technology but these systems have large size and power consumption requirements. Having a compact and efficient fusion neutron generator (FNG) would directly benefit many industries by solving the problems associated with radioactive isotopes while avoiding the complications of large accelerators.

Figure 1:
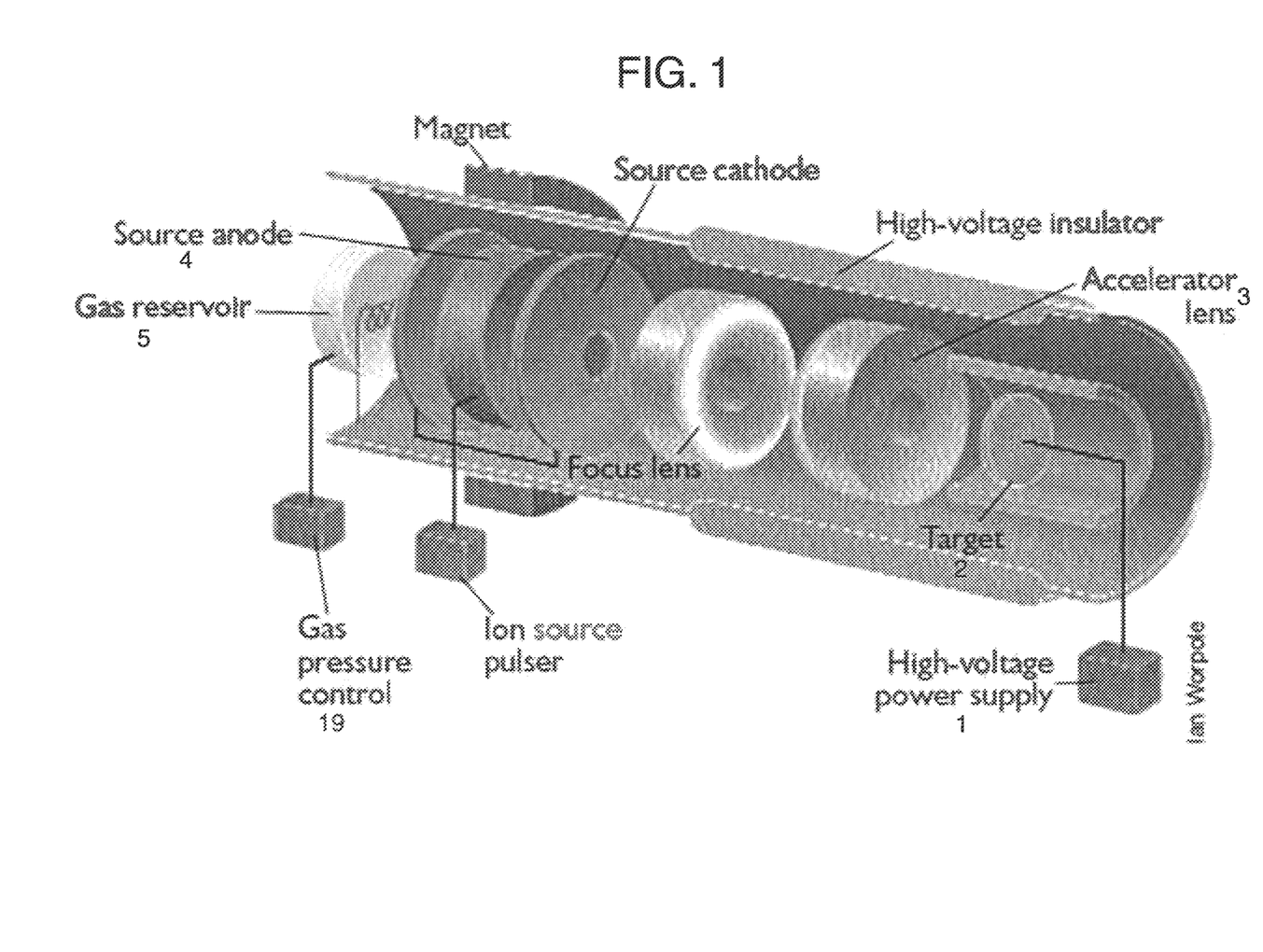
FIG. 1 is a diagram of an exemplary modern compact accelerator neutron source, according to an aspect of the invention.

The basic layout of a modern compact accelerator neutron source is shown in FIG. 1. The standard hardware consists of: a high-voltage generator 1 (~100 kV), a metal hydride target material 2 (usually titanium), one or more accelerator grids 3, an ion source assembly 4 (Penning or RF) and a gas-control reservoir 5 that often uses a hydrogen getter. Operation proceeds as follows: either pure deuterium (D-D system) or a deuterium-tritium (D-T system) mix of gas (up to 10 Ci of T) is introduced into the system at pressures around 10 mTorr; a plasma is generated to provide ions that are extracted out of the source region and accelerated to ~100 keV; these ions bombard the target 2 where they can undergo fusion reactions with other hydrogen isotopes embedded in the target 2. DD fusion reactions generate 2.45 MeV neutrons and the DT reaction makes 14 MeV neutrons. Exemplary systems can be operated continuously or in pulsed operation for time-of-flight measurements.

There are several major suppliers of non-radioactive neutron generators, all using accelerator-target configurations. List prices range between $85-350 K with the highest cost components being the high-voltage power supply, electrical feeds, and interconnects. Lifetime is typically limited by the degradation of the target material and the coating of insulators with best suppliers reporting ~1000 hours for nominal output levels of $1 \times 10^6$ DD n/s and $1 \times 10^8$ DT n/s, and replacement target units range from $5-50 K each. Currently, no suppliers have cost-effective high output (>1E8 n/s) DD systems.

Neutron generators for industrial radioisotope replacement often use the DD fusion reaction because the 2.45-MeV DD neutrons are more easily applied to existing applications that use $Cf^{252}$, which has an average neutron energy of 2.1 MeV. On the basis of fusion cross section and reaction branching alone, a DT generator has a neutron production rate ~100 times that of a DD generator, however, the shielding and moderation requirements for 14.1-MeV DT-generated neutrons compared to 2.45-MeV neutrons are much more severe, making DD more attractive for many market applications.

BRIEF SUMMARY OF THE INVENTION

Aspects of the invention include a highly-innovative approach for a compact, high-efficiency, long-life fusion neutron generator (FNG) for applications such as enhanced neutron radiography, non-destructive testing, bulk material scanning using the testing process known as Prompt Gamma Neutron Activation Analysis (PGNAA), other NAA methods, and other analytical methods utilizing neutrons. Radioisotopes, such as $^{252}$Cf, are currently used in the academic and industrial markets, but are under increasing scrutiny due to homeland security concerns. Several FNG technologies are available in the marketplace, but are hampered by high cost, large size, low efficiency, and short lifetime, typically making them unsuitable for broad use.

Figure 2:
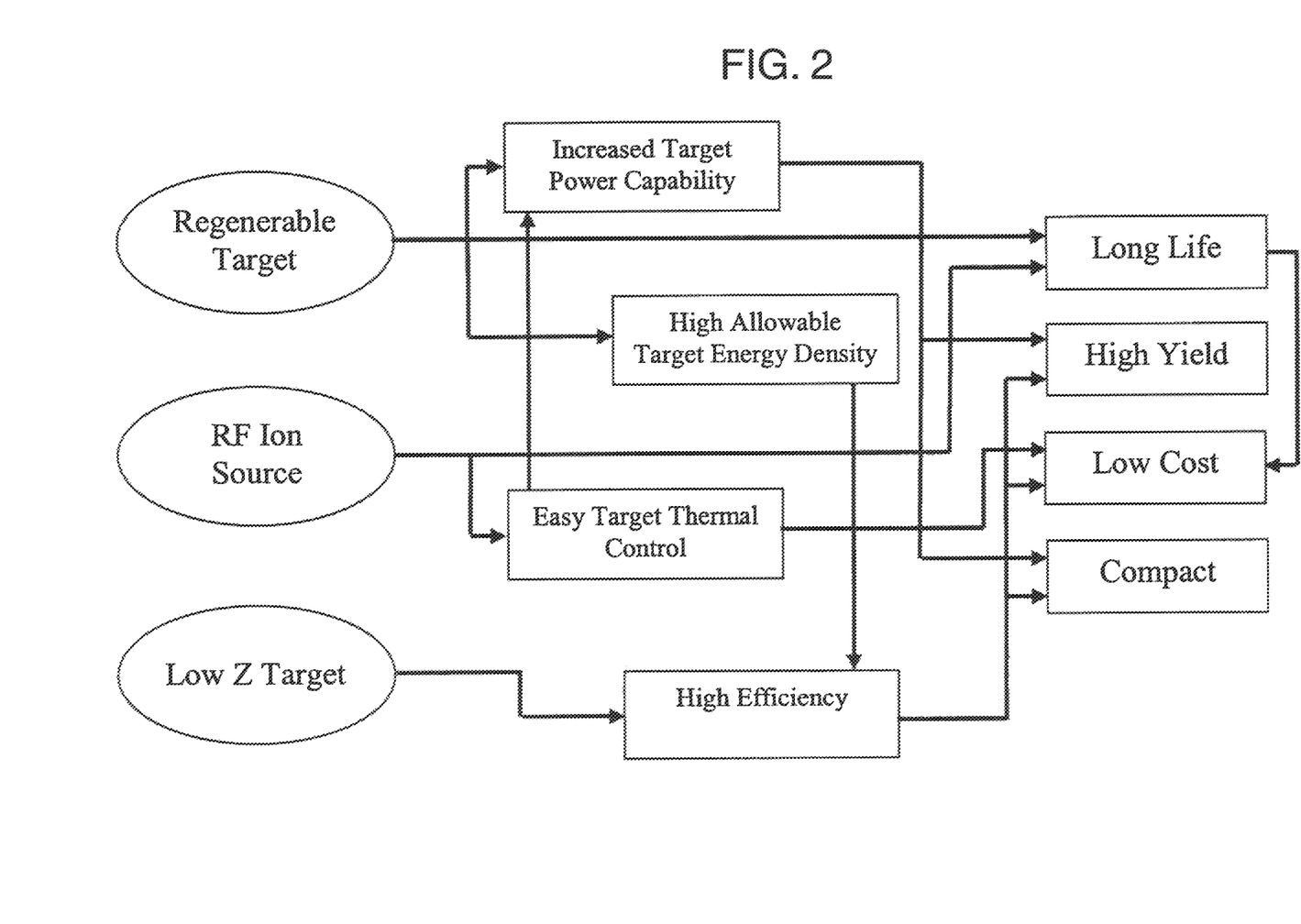
FIG. 2 is chart illustrating the properties of different components of an exemplary system, according to an aspect of the invention.

As summarized in FIG. 2, an innovation for the device as a whole results from the combination of a regenerable low-Z (low atomic number) target for long life and high efficiency with an RF ion source that allows compact and easy thermal management with long life. These factors combine to increase yield and decrease cost. Improved efficiency and better thermal properties allow the source size to be decreased, allowing its use in applications that require small sources, such as small-diameter boreholes (<2 inches). Such a compact and inexpensive source could also be used in laboratory and academic settings for geoscience and other non-destructive testing applications, such as online bulk materials analysis (such as for coal and cement mining), soil analysis, borehole logging analysis, and security screening systems, and others. These innovations would allow for radioactive neutron sources in industry to be replaced with FNGs in a wide variety of applications, improving safety and broadening the types of analysis that can be accomplished. Additionally, innovative designs have been made to combine the necessary components and subsystems of an FNG in highly efficient and cost-effective ways.

Traditional ion sources such as a Penning ion source use active filaments or multiple plasma-contacting electrodes to create ionizations. These components eventually wear out, causing a system failure and limiting lifetime. Aspects of the present invention include a radio frequency (RF) or microwave ion source which uses no electrodes and has the advantage of generating high fractions of monatomic ions. An RF ion source uses a coiled, or shaped ribbon, antenna on the outside of the system wall/insulator that deposits electromagnetic power into the gas, causing ionizations, dissociations and plasma sustainment. While current FNGs bias their target to a large negative voltage to create the acceleration field, aspects of the invention use another inherent advantage of the RF ion source and raise the voltage of the plasma while maintaining the RF hardware and the target at or near ground potential. This is possible because the RF couples its energy through electromagnetic fields instead of physical electrodes in contact with the plasma. Using a grounded target resolves several design concerns, such as thermal control of the target and target diagnostics. This has the additional benefit of allowing the neutron source—the target—to be closer to the materials being analyzed due to lack of the necessary high-voltage standoff hardware, resulting in higher neutron fluxes at the material of interest for the same source output. The RF or microwave ion source also allows for relatively easy multi-source configurations where multiple ion beams can be extracted from a common plasma region to produce a multi-point neutron source.

Figure 7:
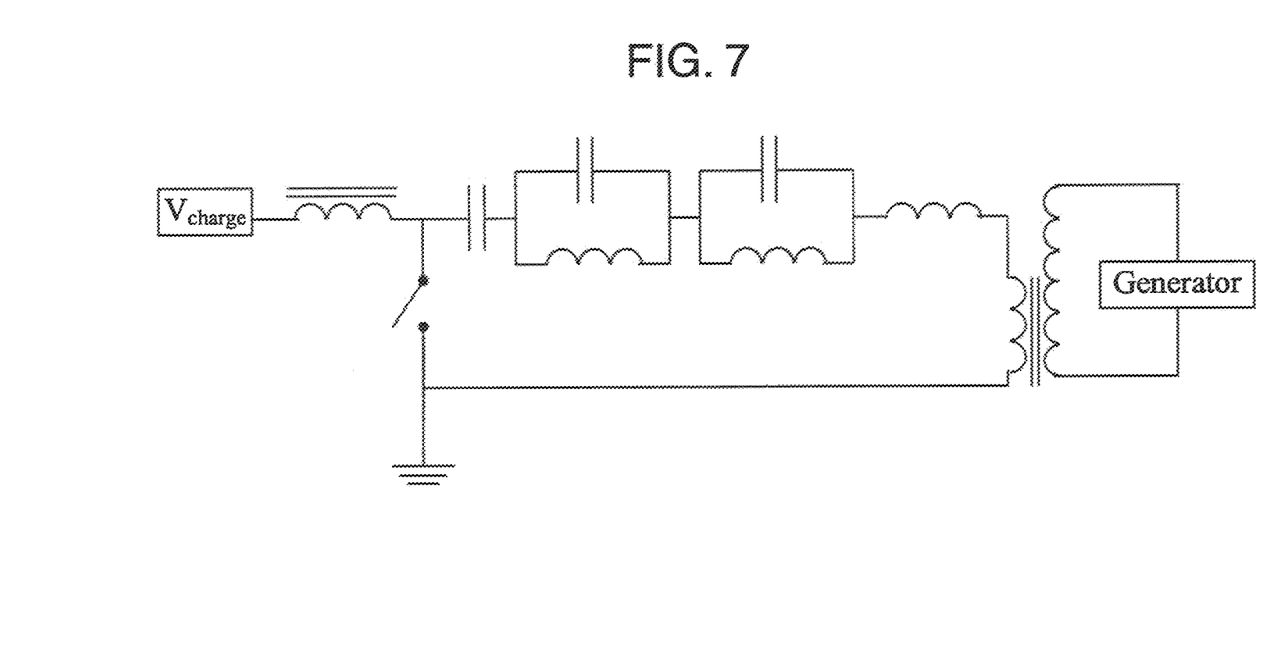
FIG. 7 is an schematic drawing of an exemplary power pulser, according to an aspect of the invention.

In addition to continuous operation, several options exist for pulsed operation. One option is to pulse an extraction electrode. This has the benefit of requiring relatively low voltage pulses, but would still require a high-voltage pulse forming network. Another option is to use a pulse transformer to directly pulse the high-voltage power. A simple schematic of a transformer-based pulsing system is shown in FIG. 7. This exemplary method has the advantage of allowing low-voltage pulse forming network elements and a low-voltage (lower cost) DC power supply. The use of beam-bunching electrodes can further shorten pulses of a system down to the nanosecond range. The choice of pulsing technique depends on the cost, size and the needs of the end-user. All of these techniques are capable of achieving pulse lengths in the range of 0.1-10,000 µs with a corresponding broad range of repetition rates, depending on the duty factor of the pulse system.

Further exemplary systems described herein can be integrated with associated particle imaging (API) techniques.

DETAILED DESCRIPTION OF THE INVENTION

Figure 3:
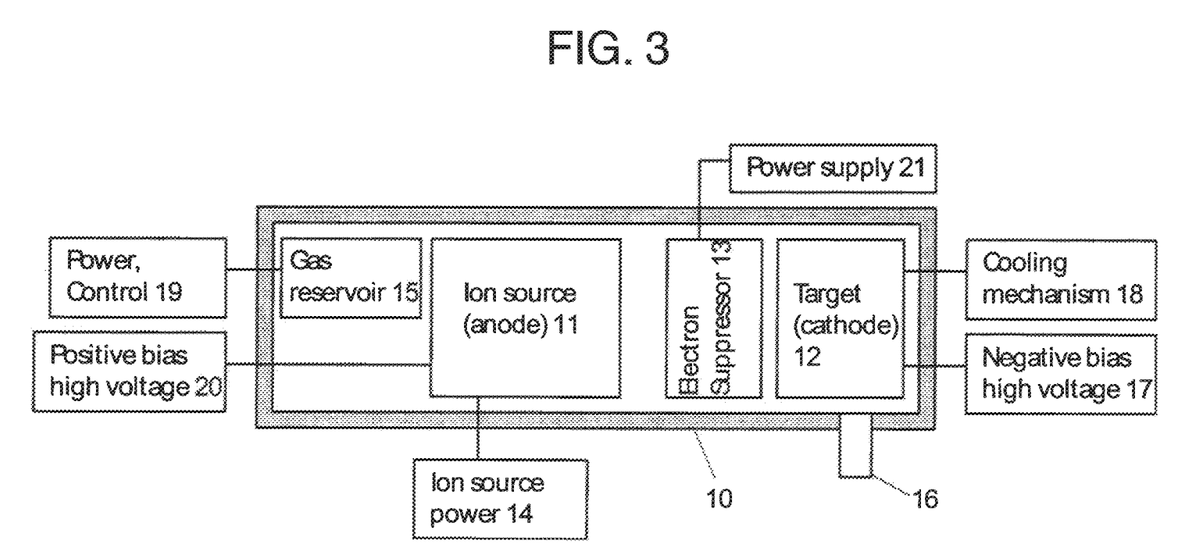
FIG. 3 is an exemplary neutron generator block diagram, according to an aspect of the invention.

FIG. 3 shows the layout for the "neutron tube" core of a generic embodiment of the invention. A vacuum vessel 10 forms the main structure. Inside are the three primary electrodes: the ion source (anode) 11, neutron-producing target (cathode) 12, and electron suppressor electrode 13. The ion source power supply 14 creates AC, DC, or radio frequency/microwave power depending on the type of ion source 11 used. A non-evaporable getter 15 is used to control gas pressure via heating.

Figure 4:
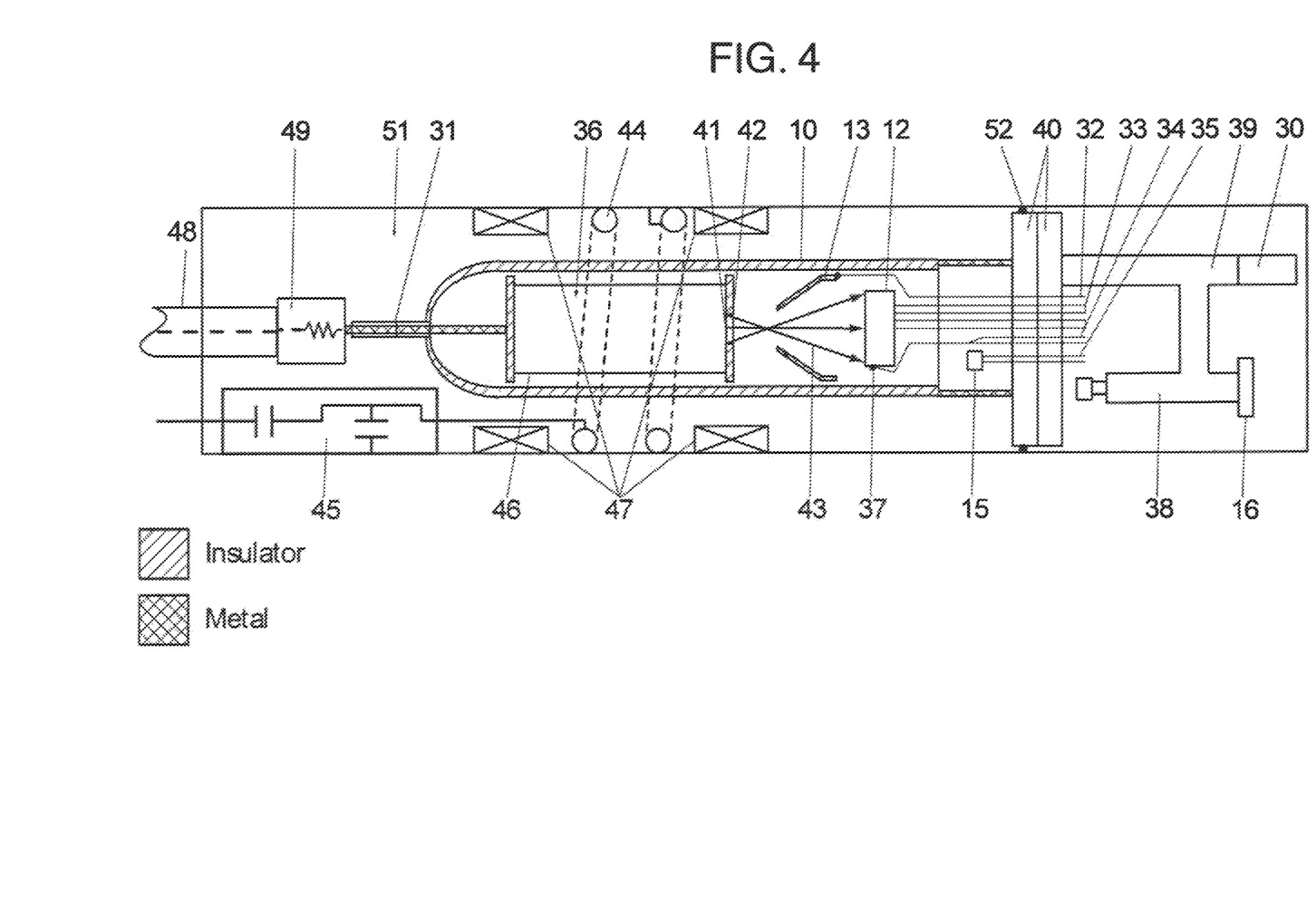
FIG. 4 is an exemplary neutron generator, according to an aspect of the invention.

In one possible embodiment shown in FIG. 4, the vacuum vessel 10 is a sealed tube made of a combination of conductor and insulator. If one end of the neutron tube is at low voltage, it can easily be made of conductive material facilitating fabrication and installation of electrical feedthroughs. Conductors used include primarily aluminum, stainless steel, copper, and kovar. Stainless steel and iron are minimized to reduce gamma signature in NAA applications. Glass, quartz, or alumina (or similar ceramic) can be used for insulated, high voltage areas. The outer diameter for this style of vacuum vessel 10 can range from 0.25" to 12". As seen in FIG. 4, attached to the vacuum vessel 10, auxiliary to the neutron tube, can be a diagnostic pressure gauge 30, for example an ionization gauge. Electrical feedthroughs 31, 32, 33, 34, 35 allow voltages to be applied to or read from to the ion source 37, suppressor 13, target 12, diagnostic thermocouple 37 and getter 15, and also control other diagnostics and internal systems. To evacuate the vessel, a pump-out port 16 is included made of copper pinch-off tube, glass tube, or a mechanical valve 38. To fit these features within space constraints, vacuum-compatible tubing 39 may be used. Pump-out port 15 can be attached to metal or insulator sections of the vessel. In the case of systems assembled completely in a vacuum environment, a pump-out port may not be needed. The body of the vacuum vessel 10 is comprised of pre-made glass to metal or ceramic to metal seals that can be brazed or welded together using standard metalworking or glass working techniques, and/or have two sections affixed to each other with vacuum flanges 40 for easy assembly/disassembly, typically ranging in diameter from 1-⅓" to 12". During assembly the vessel 10 is pre-loaded with an appropriate amount of deuterium and/or tritium gas. For systems in output and lifetime configurations where helium buildup is a concern from the plurality of neutron-producing reactions, an ion pump style of device can also be attached to the vessel to pump away helium and other contaminants after the getter 15 has temporarily pumped away the working gas.

The ion source 36 is the anode 11 of the system that produces a plurality of ions that are accelerated into the target 12. The ion beam 43 is extracted from the ion source 36, goes through an opening in suppressor 13, and finally impinges on the target 12. The amount of extracted current should be from 10 nA/cm$^2$ to 1 kA/cm$^2$. At the front of the ion source 36 is an extraction plane 41 with an open diameter typically between 1 mm and 80% of the ion source 36 diameter combined with electrode shapes 42 that customize the focusing of the extracted ion beam 43 to cover most or all of target 12. The extraction plane 41 may or may not contain a gridded extraction screen with a high percentage open area and grid spacing typically between 20 in-1 and 150 in-1, dependent on plasma properties. The system may or may not have an extraction bias electrode (not shown) positioned between the ion source 36 and the suppression electrode 13 to aid in extracting ion current. The ion beam 43 is shaped such that the energy density impinging on the target 12 is substantially uniform. This is beneficial for power/heat handling, neutron production efficiency, and target 12 lifetime. The type of ion source 36 used can be, but is not limited to, radio frequency (RF) using an RF antenna 44 and matching network system 45, electron-cyclotron resonance (ECR) using microwave generator 70 to make microwave energy 71, Penning (cold cathode) 4, field ionization, or spark gap. The anode 11 region in vacuum may range from 1" to 12" long, filling either partially or completely the diameter of the vacuum vessel 10 containing it.

In the case of the RF ion source, the ion source 36 is comprised of a glass container 46 (to increase monatomic species fraction relative to quartz or alumina) inside of vacuum vessel 10 (to reduce the amount of sputtering, contamination, and ion-electron recombination compared to a steel or alumina container), RF antenna 44 (wrapped cylindrically around vacuum vessel 10 with 0.5 to 10 turns), magnets 47 (to make a strong, substantially uniform axial magnetic field of strength 10 Gauss to 10000 Gauss inside ion source 36 to minimize power losses from plasma-wall interactions), and RF matching network 45. Glass container 46 may be integral to vacuum vessel 10 (for example, see vacuum vessel 72). RF power input to the ion source 36 can range from 0.1 W to 10,000 W. The RF frequency can be in the range of 0.1 MHz to 1 GHz. Matching network 45 contains capacitors and/or inductors that can be of fixed and/or adjustable values, arranged in an "L" or "pi" configuration. The components can have the values fixed at the factory or be adjustable during operation with a stepper motor or similar system. To further fine-tune matching conditions in an assembled system, the frequency at which the RF generator 14 operates can be adjusted in sufficiently small increments. The components are chosen, arranged, tuned, and fixed in place in a relative arrangement similar to what is shown in FIG. 4 to excite one or more modes to form and maximize plasma density and amount of extractable current, maximize monatomic species fraction in the ion beam 43, and optimize usage of RF power. The use of an ECR ion source (see FIG. 6) can accomplish these objectives even more effectively. Typical values of frequency can range from 200 MHz to 20 GHz. Microwave energy can be applied to ion source with an external applicator including, but not limited to, a waveguide, dielectric window, or antenna launching structure. The magnetic field is shaped to create a zone of electron cyclotron resonance. The ion source 11 can be raised to a positive voltage or run at ground potential. The configuration is chosen to be appropriate for the requirements of pulsing, power level, size, and lifetime. For the embodiment in FIG. 4, the target 12 is near ground potential while the ion source 36 is raised to a high positive DC voltage.

The electron suppressor electrode 13 works with the ion source extraction optics 41, 42 to shape the ion beam 43. It should be biased negative with respect to the target (cathode) electrode 12 by an amount ranging from 0 V to 10,000 V. It can be biased with a separate power supply 21, or be biased using a resistor or zener diode system attached to the target 12. It is sized and shaped such that field emission from the high voltage gradients is avoided. The outer diameter of the suppressor 13 should substantially fill the inner diameter of vacuum vessel 10; the opening at the center should be large enough to allow the ion beam 43 to pass through unobstructed, while not being so large so as to require a prohibitively large voltage difference between it and the target 12 to effectively suppress secondary electrons emitted from the target due to impinging ions. The one or more electrodes are arranged to shape an electric potential to cause a substantial fraction of ions from the ion source to collide with the target, to reduce electron losses to an anode electrode.

The solid target (cathode) electrode 12 consists of a cooled metal substrate via coolant connections 33 (also used as an electric feed if a bias voltage is applied), usually stainless steel, nickel, copper or molybdenum, that is coated with a layer of hydrogen-absorbing material, such as lithium, titanium, or others to achieve useful neutron-producing reactions. Low-Z materials are often preferable to increase efficiency. A target material may have at least one of the following properties: the average or effective atomic number of the target material is between 1 and 21; the target material can be regenerated in situ; the target material can be deposited in situ; the target material has the capability of causing secondary neutron-producing reactions with cross sections greater than 1 microbarn. The target may include hydrogen isotopes, lithium, lithium isotopes, lithium compounds including $LiD$, $LiAlD_4$, and $LiBD_4$, lithium alloys, and any mixture or combinations thereof. The target 12 can be maintained at ground potential or biased negative with an external power supply 17. Furthermore, the bias voltage between the suppressor and the target can be maintained by either connecting the suppressor to a negative voltage, or grounding it, and connecting the target to the suppressor through a zener diode, resistor, or other voltage regulation device. The size of the target 12 can be chosen appropriately for the application, power load, and lifetime needed. A substantially flat, circular shape is preferred, but other shapes, such as slanted, conical, or cylindrical, can be used to control sputtered material amounts and locations (both of source and destination) and to provide for unique neutron source emission areas/volumes. A circular target 12 for this style of device can range from 0.1" to 12" in diameter. A neutron tube 10 with two or more targets on either side of an ion source can be made so that two or more sources of neutrons are located inside of one device. Use of intentional sputtering and evaporation inside the vacuum vessel 10, 72 can have many benefits for system lifetime and efficiency. An attached thermocouple 37 or other means of measuring temperature can be used as a diagnostic while in operation. The cooling system 18 of the target 12 can be electrically isolated from the vacuum vessel 10, 72 in order to measure beam 43 current landing on the target 12 and for other diagnostic purposes. Active liquid cooling through channels 33 embedded in the target can be used for high power applications with either ambiently or actively cooled fluids. It is also possible to use a heat sink, exhausting to the surroundings. The location of the target can be anywhere beyond the suppressor electrode 13 in the path of the ion beam 43, viz. near the extreme end of the system to increase neutron flux on adjacent materials under test. The surface material of the target 12 can be deposited and/or refreshed in situ 3. Target 12 lifetime can be extended through use of regeneration. The target 12 material can also be chosen carefully to dictate the neutron output energy spectrum while still using deuterium and/or tritium as the working fuel. This includes making the system a source of fast (>2.5 MeV) neutrons without using radioactive tritium gas.

The gas reservoir 15 can be a simple titanium filament or a non-evaporable getter pump for increased vacuum vessel 10, 72 vacuum quality. It can be located in a low-voltage area, such as behind the target 12, to the side of the target 12, or behind or in the ion source region 36. An external power supply 19 runs ac or dc current through the device through an electrical feedthrough 35 to heat and control the gas reservoir's 15 temperature, thus controlling the pressure of the working gas in the vacuum vessel 10, 72. It is loaded with an appropriate amount of deuterium and or tritium gas to achieve operating pressures between $10^{-5}$ Torr and $10^{-2}$ Torr while maintaining enough of a reserve amount of gas to compensate for the effects of contamination and radioactive decay over time.

High voltage power supplies 17, 20 are used to separate the ion source (anode) 11, 36 and target (cathode) 12 by fusion-relevant voltages, from 10 kV to greater than 500 kV. This can be accomplished with a positive voltage supply 20 connected to the anode 11, 36, a negative voltage supply 17 connected to the cathode 12, or both. The high voltages can be generated though a variety of means, such as with a traditional Cockcroft-Walton voltage multiplier 73, piezoelectric crystal transformer, or with pyroelectric crystal technology. The high voltage generation can be done in the generator system next to the neutron tube 10 or the high voltage can be transmitted to the neutron tube via an umbilical cable 48. To help stabilize the system and reduce the effects of accidental high-voltage arcing, over-currenting, or other problems, ballast resistance 49 may be used, which can range in value from 10 kΩ to 10 MΩ.

The external enclosure 50 contains the neutron tube 10 and associated feedthroughs, electronics, and power supplies. It is constructed from a conducting structural material such as aluminum or stainless steel to provide a ground shield around the entire system for safety and to prevent RF noise from affecting other equipment. The grounded enclosure 50 is filled with an insulating fluid 51 for high voltage standoff and cooling, such as mineral oil, transformer oil, $SF_6$ gas, or a fully fluorinated insulating fluid such as Fluorinert, which is sealed around the neutron tube 10 with seal 52.

A control console may be included in the exemplary system that contains most or all of the needed support equipment in an enclosure or rack that protects the equipment and makes it accessible to the user for setting and monitoring operational parameters. The system controller should be housed here, which may be comprised of a personal computer, field-programmable gate array (FPGA), or other custom or standard circuitry. Analog and digital inputs and outputs allow the control system to communicate with the other pieces of equipment, viz. the ion source power supply (RF or microwave amplifier) 14, other power supplies as diagrammed in FIG. 3, gas reservoir 15, and any applicable coolant systems 18. Aspects of invention may include a plurality of diagnostic sensors selected from the group consisting of a particle detector, a current detector, a voltage detector, a resistivity monitor, a pressure gauge, a thermocouple, and a sputtering meter. In addition, for a grounded target, the electrode area can maximized for a given neutron tube diameter to improve longevity and tube life. The control station is connected to the neutron tube 10 via a bundle of coaxial cables, wires, and tubing.

Figure 5:
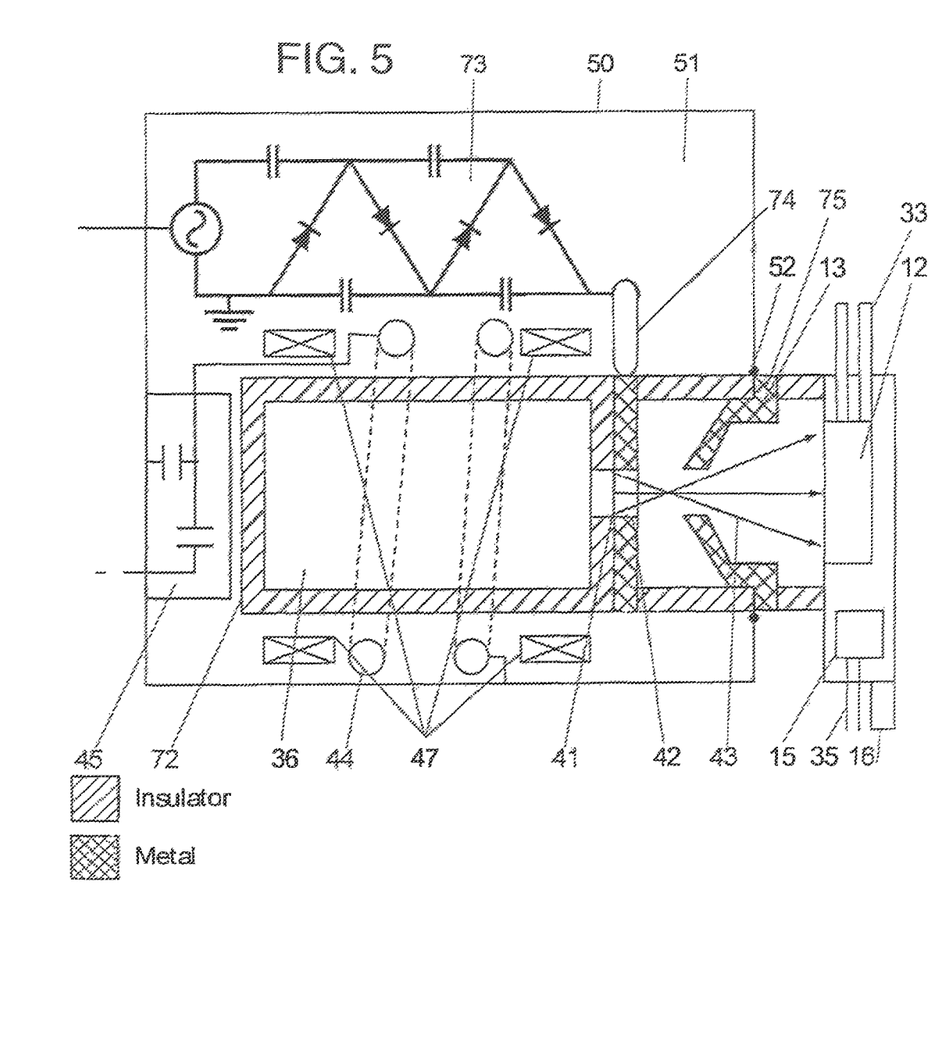
FIG. 5 is an exemplary neutron generator with RF ion source, according to an aspect of the invention.

A preferred embodiment is detailed in FIG. 5. The vacuum envelope is a small diameter insulating tube 72 utilizing an RF-powered ion source 36 with magnet material 47. The ion source 36 is raised to high voltage with power supply 20 (depicted as a custom-built and sized Cockcroft-Walton voltage multiplier 73 located adjacent to the neutron tube 10 so that no high voltage umbilical cables 48 are required, and fed into vacuum vessel 72 with feedthrough 74 embedded in vacuum vessel 72 to bias beam-shaping electrodes (41, 42)) and the flat, circular target 12 is at ground potential. The suppressor 13 is biased via feedthrough 75 embedded in vacuum vessel 72. An advanced getter material 15 is loaded with D and/or T and uses a closed-loop control system 19 to maintain stable gas pressure in the vacuum vessel 72. The target 12, comprised of a thin layer of lithium to maximize efficiency 2 and customize the neutron energy spectrum 5, is located on a cooled substrate made of a material such as nickel or molybdenum and can be regenerated 4 with heat from the ion beam 43 and through an in-situ evaporation process 3 that does not require the neutron tube 72 to be opened. The target 12 is located near the extreme end of the system to place maximum neutron flux on the objects under test. For demanding applications where target thermal management is a necessity, such as borehole oil well logging, a grounded target 12 can be directly heatsinked to the external enclosure 50 to efficiently transport heat generated by the ion beam interaction with the target to the surrounding environment. The external enclosure 50 is made of aluminum to minimize NAA signals; similarly, use of carbon steel and stainless steel in general is minimized. The external enclosure 50 is filled and sealed with a fully fluorinated insulating and cooling fluid to avoid neutron moderation and absorption by hydrogen.

Figure 6:
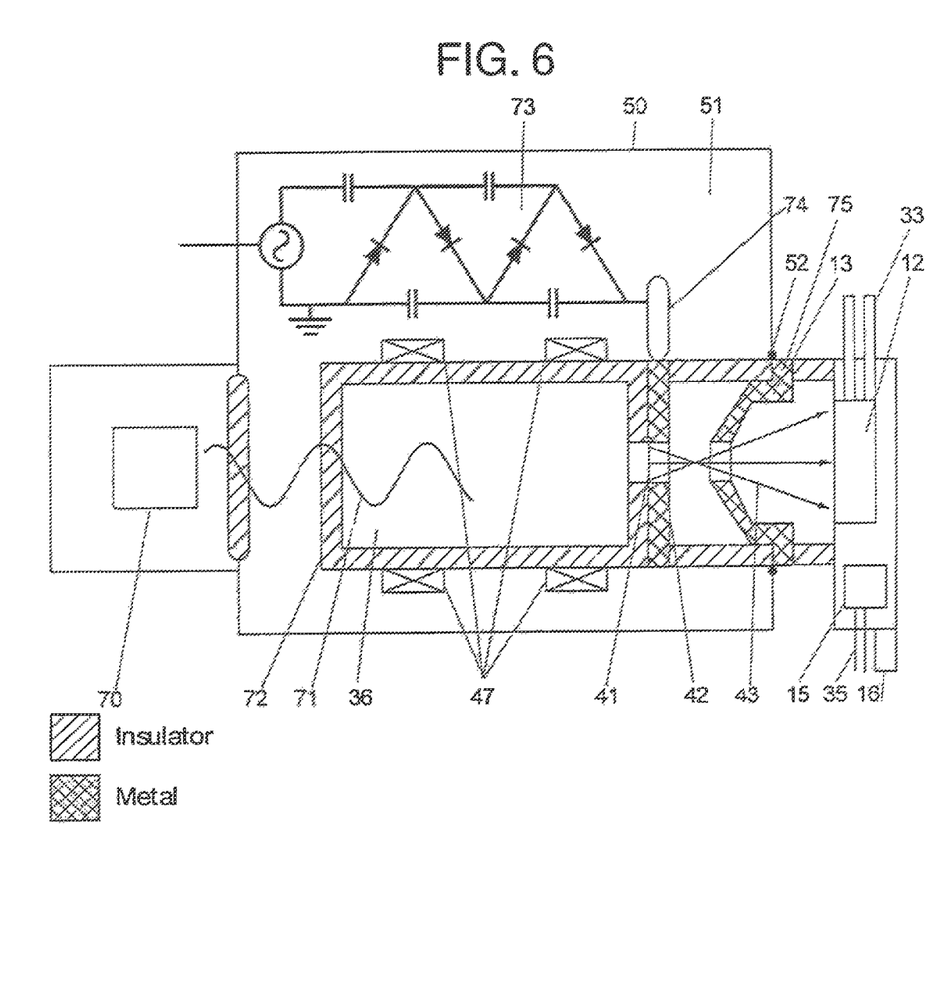
FIG. 6 is an exemplary neutron generator modified for ECR ion source, according to an aspect of the invention.

FIG. 6 shows a preferred embodiment modified to use an ECR-type ion source 36 using microwave generator 70 to make microwave energy 71, exciting gas molecules to create ionizations. Basic layouts of components auxiliary to neutron tube (10, 72) can be readily adjusted for the device to fit within the size and shape constraints of a given application.

Aspects of the invention include a neutron generator having an RF ion source. To achieve high atomic fractions in such neutron generators (e.g. >50%) inductively coupled plasma discharges are often used. Traditionally these require kilowatt-level power for hydrogen discharges due to the high mobility of hydrogen ions in the plasma. As a result intense heating and thermal cooling issues make compact devices difficult and expensive to engineer. For example, the prior art uses sapphire windows with specialized cooling structures to manage multi-kilowatt levels and molybdenum surfaces to sustain high thermal loads.

Aspects of the invention include an approach to design the plasma source cavity to encourage dissociation of molecular hydrogen gas through plasma interaction while maintaining a high degree of atomic hydrogen trapping or confinement within the plasma region for subsequent ionization. This can be accomplished by using a low recombination rate surface materials exposed to the plasma and high geometric trapping design of the plasma source region. Additionally, surfaces can be treated to reduce their surface recombination properties by a variety of techniques including but not limited to, chemical etch, material deposition, baking, coating, and plasma treatment.

In an embodiment, the plasma source region is crafted with low-recombination material surfaces and an exit aperture such that dissociated hydrogen atoms will bounce around within the plasma source volume with a high degree of confinement until ionization near the exit aperture for ion beam extraction. Optimization of this neutral atomic trapping can be done by shaping the ion source.

Using a magnetic mirror configuration, RF energy can be efficiently transferred into the plasma near the exit aperture using the magnetic mirror effect. RF plasma pumping can drive electrons into a high magnetic field location and transfer axial energy into radial energy. Electrons with high radial energy ionize and dissociate hydrogen rapidly while low axial velocity increases local density in the high B field region and produce a high-quality ion beam. The RF antenna is located in the region of lower magnetic field such that electrons are accelerated into the higher B section with the RF or electromagnetic field. The applied RF frequency can be adjusted to maximize plasma power deposition into the high field region in relation to the electron bounce frequency between the RF antenna region and the high field region. The ion source exit aperture is located near this region to source high currents. Combined with low-recombination materials and geometric trapping, high atomic hydrogen ion fractions and beam currents can be obtained with low input power levels. For a 1-inch diameter tube, currents in excess of 1 mA have been obtained for power levels of less than 5 W with good atomic to molecular fractions.

The design of the magnetic mirror, B field shape and plasma source volume and ion beam extraction aperture can be optimized for different neutron generator applications, e.g. small diameter for oil-well logging applications, high current for neutron radiography or cargo inspection applications, etc. Adjusting the source profile affects the beam profile projected onto the target. This is important for heating purposes and it is desired to have a uniform target loading. In one embodiment, the magnetic mirror is adjusted such that the ion source exit aperture magnetic field is close to that of the field in the RF source region to produce a highly-uniform beam at the target location.

Another embodiment of invention may include one ion source that generates ions that are accelerated and collide with one or more target materials each at a different target location. A further embodiment may include a negative ion source.

A state-of-the-art high-efficiency ion source using a helicon RF plasma produces 8.1 mA of ion current using 1.24 kW of RF power for an efficiency of 6.5 microamperes per Watt of RF power. An aspect of the invention produces at least 10 microamperes of ion current per Watt of RF power. By enhancing the neutral atomic species trapping in the ion source, 10 microamperes of atomic ion current per Watt of RF power can also be attained.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An extended lifetime system for generating neutrons comprising:
    an external enclosure;
    an insulating dielectric contained within the external enclosure;
    a high voltage power supply;
    a target at a target location capable of being loaded with hydrogen isotopes selected from the group consisting of: deuterium and tritium;
    an ion source assembly configured to supply a beam of ions, the ion source assembly comprising:
        a vessel comprising a wall made from an insulator material and having a plasma source cavity containing a plasma source from which a plasma is generated;
        an anode electrode, connected to the high voltage power supply, the anode electrode being configured to bias the plasma;
        an external applicator that is:
            electrically connected to an excitation signal source, and
            configured to deposit electromagnetic energy into the plasma source cavity through electromagnetic fields passing through the wall made from an insulator material,
            wherein the external applicator is selected from the group consisting of an RF antenna and a microwave launcher,
            wherein an insulating gap comprising the insulating dielectric separates the external applicator and the plasma source cavity; and
    a target electrode electrically coupled to the target
    wherein the high voltage power supply is configured to deliver a voltage between the anode electrode and the target electrode between 10 kV and 500 kV.

2. The system according to claim 1, wherein the target electrode is electrically grounded to the external enclosure.

3. The system according to claim 1, wherein the target is physically located outside of the external enclosure.

4. The system according to claim 1, further comprising a gas-filling port, a sealing mechanism, and a gas reservoir containing hydrogen isotopes.

5. The system according to claim 1, further comprising a plurality of sensors and diagnostic instruments selected from the group consisting of: a charged-particle detector, a neutron detector, a photon detector, a beam sensor, a current detector, a voltage detector, a resistivity monitor, a temperature sensor, a pressure gauge and a sputtering meter.

6. The system according to claim 1, wherein the target is located near an extreme end of the system to place maximum neutron flux on objects under test.

7. The system according to claim 1, further comprising a magnetic field producing structure, the magnetic field producing structure having at least one magnet configured to produce a magnetic field having a peak magnetic induction between 0.001 to 1 Tesla near one or more ion beam extraction locations.

8. The system according to claim 1, further comprising a suppression electrode connected to a voltage supply configured to bias the suppression electrode between 0 and −10 kV relative to the target electrode.

9. The system according to claim 8, wherein the target location is beyond the suppressor electrode in a path of the ion beam.

10. The system according to claim 1, further comprising a surface material of the target that can be deposited and/or refreshed in situ.

11. The system according to claim 1, further comprising an extraction electrode and/or beam-bunching electrodes.

12. The system according to claim 1, wherein the insulating dielectric is a solid material.

13. The system according to claim 1, wherein the microwave launcher is selected from the group containing a waveguide, dielectric window or antenna launching structure.

14. The system according to claim 1, wherein the external applicator is configured to supply electromagnetic energy having a frequency of between 0.1 MHz and 20 GHz to the plasma source cavity.

15. The system according to claim 1, wherein the target electrode is thermally-connected to one or more of a thermal management system and a vacuum vessel that encloses the plasma source cavity.

16. The system according to claim 1, wherein the target electrode is one or more of thermally-connected to the external enclosure and electrically-connected to the external enclosure.

17. The system according to claim 1, wherein the high-voltage power supply is contained within the external enclosure.

18. The system according to claim 1 wherein in operation the external applicator is maintained near ground electric potential.

19. The system according to claim 1, wherein the target material comprises lithium.

20. A method for generating neutrons using a neutron generator comprising
   an external enclosure;
   an insulating fluid contained within the external enclosure;
   a high voltage power supply;
   a target at a target location supporting a layer of target material capable of being loaded with hydrogen isotopes selected from the group consisting of: deuterium and tritium;
   an ion source assembly configured to supply a beam of ions, the ion source assembly comprising:
      a vessel comprising a wall made from an insulator material and having a plasma source cavity containing a plasma source from which a plasma is generated;
      an anode electrode, connected to the high voltage power supply, the anode electrode being configured to bias the plasma;
      an external applicator that is:
         electrically connected to an excitation signal source, and
         configured to deposit electromagnetic energy into the plasma source cavity through electromagnetic fields passing through the wall made from an insulator material,
         wherein the external applicator is selected from the group consisting of an RF antenna and a microwave launcher,
         wherein an insulating gap comprising the insulating fluid separates the external applicator and the plasma source cavity; and
   a target electrode electrically coupled to the target
   wherein the high voltage power supply is configured to maintain a voltage between the anode electrode and the target electrode between 10 kV and 500 kV,
   the method comprising:
      feeding an excitation signal to the external applicator;
      coupling, through electromagnetic fields, electromagnetic energy produced by the external applicator into a gas within the plasma source cavity;
      extracting, from the plasma source cavity, an ion beam, and
      causing the ions in the ion beam to collide with target material in the target material layer to generate neutrons.

21. The method according to claim 20, further comprising one or more of the group consisting of:
   applying an extraction electrode or electrostatic field shaping element to improve beam quality such that a substantial fraction of ions exiting the ion source are on trajectories to impinge on the target;
   substantially occluding metallic electrodes from contacting the plasma contained within the ion source to reduce sputtering and erosion; and
   operating a plasma source at or near a resonance condition to generate a majority fraction of monatomic ions that improve the effective energy per ion accelerated to a target location,
   wherein the plasma ion source is generated in a cavity having one or more reduced atomic-recombination surfaces resulting from material selection and surface treatment and one or more constrictions that decrease the flow of neutral atomic species out of the ion source.

* * * * *